United States Patent
Marulanda-Paz et al.

(10) Patent No.: US 9,919,279 B2
(45) Date of Patent: Mar. 20, 2018

(54) SHAFT SPACING FLANGE FOR A KNEADING MACHINE

(71) Applicant: B&P Process Equipment and Systems LLC, Saginaw, MI (US)

(72) Inventors: Gonzalo Marulanda-Paz, Saginaw, MI (US); James P. Woodcock, Gladwin, MI (US)

(73) Assignee: B&P Littleford LLC, Saginaw, MI (US)

( * ) Notice: Subject to any disclaimer, the term of this patent is extended or adjusted under 35 U.S.C. 154(b) by 278 days.

(21) Appl. No.: 14/653,224

(22) PCT Filed: Dec. 16, 2013

(86) PCT No.: PCT/US2013/075447
§ 371 (c)(1),
(2) Date: Jun. 17, 2015

(87) PCT Pub. No.: WO2014/099807
PCT Pub. Date: Jun. 26, 2014

(65) Prior Publication Data
US 2015/0328606 A1 Nov. 19, 2015

Related U.S. Application Data

(60) Provisional application No. 61/738,135, filed on Dec. 17, 2012.

(51) Int. Cl.
*B01F 11/00* (2006.01)
*B29B 7/42* (2006.01)
(Continued)

(52) U.S. Cl.
CPC .......... *B01F 15/0048* (2013.01); *B01F 7/082* (2013.01); *B01F 7/085* (2013.01);
(Continued)

(58) Field of Classification Search
CPC ............................ B01F 11/0057; B29B 7/423
(Continued)

(56) References Cited

U.S. PATENT DOCUMENTS 1,469,304 A * 10/1923 Hughes ..................... F16D 1/05
403/305
1,636,262 A * 7/1927 Troendly .................. F16D 3/72
403/359.5
(Continued)

FOREIGN PATENT DOCUMENTS

CN 202161960 3/2012
JP 2005-131578 5/2005
(Continued)

OTHER PUBLICATIONS

Chang, Bong Ho, International Search Report, dated Apr. 15, 2014, PCT/US2013/075447, ISA/KR.
(Continued)

*Primary Examiner* — David Sorkin
(74) *Attorney, Agent, or Firm* — John B. Hardaway, III; Nexsen Pruet, LLC

(57) ABSTRACT

An adjustable coupler for linking an oscillating kneader to a gear box. The adjustable coupling has a slide coupler adapted to be slidably received within an output couple of a gear box. The slide coupler has external splines wherein the external splines mate with splines of the output couple thereby coupling rotation of the slide coupler with rotation of the output couple. The internal splines are capable of mating with external splines of a slidably received kneader input shaft thereby coupling rotation of the kneader input shaft with rotation of the slide coupler. A plug in the slide coupler abut the kneader input shaft in the slide coupler and a lock mechanism maintains the kneader input shaft abutted against the plug.

11 Claims, 5 Drawing Sheets

(51) Int. Cl.
  *B01F 15/00* (2006.01)
  *B01F 7/08* (2006.01)
  *F16L 19/02* (2006.01)
  *F16D 1/108* (2006.01)
  *F16D 1/076* (2006.01)
  *F16D 1/06* (2006.01)

(52) U.S. Cl.
  CPC ...... *B01F 11/0054* (2013.01); *B01F 11/0057* (2013.01); *B01F 15/00487* (2013.01); *B29B 7/423* (2013.01); *F16D 1/108* (2013.01); *F16L 19/0206* (2013.01); *B01F 2015/00649* (2013.01); *F16D 1/076* (2013.01); *F16D 2001/062* (2013.01)

(58) Field of Classification Search
  USPC .............................. 366/79, 331; 403/300–309
  See application file for complete search history.

(56) References Cited

U.S. PATENT DOCUMENTS

| | | |
|---|---|---|
| 2,547,151 A | 4/1951 | Braeseke |
| 2,629,132 A | 2/1953 | Willox |
| 2,916,769 A | 12/1959 | Keith |
| 3,115,681 A | 12/1963 | Hendry |
| 3,133,316 A | 5/1964 | Arpajian |
| 3,219,320 A | 11/1965 | Fritz |
| 3,224,739 A | 12/1965 | Schuur |
| 3,253,818 A | 5/1966 | Seddon |
| 3,281,899 A | 11/1966 | Dacco |
| 3,285,163 A | 11/1966 | Burner |
| 3,317,962 A | 5/1967 | Reynolds |
| 3,456,298 A | 7/1969 | Foster |
| 3,458,894 A | 8/1969 | Wheeler |
| 3,570,588 A | 3/1971 | Wheeler |
| 3,728,053 A | 4/1973 | Stillhard |
| 3,734,667 A | 5/1973 | Day |
| 3,788,609 A | 1/1974 | Toczyski |
| 3,855,869 A | 12/1974 | Dimitrov |
| 3,862,551 A | 1/1975 | Loomans |
| 3,908,968 A | 9/1975 | Bielfeldt |
| 4,004,788 A | 1/1977 | Ronner |
| 4,223,600 A | 9/1980 | Adarraga |
| 4,538,917 A | 9/1985 | Harms |
| 5,089,178 A | 2/1992 | Passoni |
| 5,178,461 A | 1/1993 | Taniguchi |
| 5,391,000 A | 2/1995 | Taniguchi |
| 6,431,755 B1 | 8/2002 | Schneider |
| 8,807,825 B2 | 8/2014 | Samborn et al. |
| 2003/0159536 A1* | 8/2003 | Bergkvist ................ B62D 1/20 74/492 |
| 2007/0140054 A1 | 6/2007 | Stocker |
| 2007/0171767 A1 | 7/2007 | Mao-Hsin |
| 2007/0183253 A1 | 8/2007 | Siegenthaler |
| 2012/0039145 A1 | 2/2012 | Samborn |

FOREIGN PATENT DOCUMENTS

| | | |
|---|---|---|
| JP | 2008-190677 | 8/2008 |
| KR | 10-2008-0039882 | 5/2014 |

OTHER PUBLICATIONS

Chang, Bong Ho, Written Opinion, dated Apr. 15, 2014, PCT/US2013/075447, ISA/KR.

Truchot, Alexandre; Extended European Search Report; European Patent Office; EP 11818670.9; dated Jun. 16, 2015.

Lee, Dong Wook; PCT Written Opinion of the International Searching Authority; PCT/US2013/075197; Korean Intellectual Property Office; dated Apr. 14, 2014.

\* cited by examiner

SHAFT SPACING FLANGE FOR A KNEADING MACHINE

BACKGROUND

The present invention is related to an improved spacing flange for a kneading machine. More specifically, the present invention is related to an adjustable spacing flange for connecting a gear box to a kneading machine.

Kneading machines are widely used in the industry. A kneading machine comprises a gear box which rotates, often with translation, a shaft wherein the shaft has flights thereon. An exemplary kneading machine is described in U.S. Publ. Pat. Appl. No. 2012/0039145 which is incorporated herein by reference.

During assembly the kneader and the gear box are mounted to a frame such that mating flanges are in a mating relationship and the flanges are joined such as by threaded members. Due to the weight and size of the kneader and gear box it is extremely difficult to mount both elements such that the flanges mate exactly. Therefore, it is almost a certainty that a spacer will be required between the two flanges. The typical procedure is to fabricate a spacer with a thickness which is the same as the separation between flanges. This is time consuming and inaccurate often leading to insufficient coupling.

There has been a long standing need for a shaft spacing flange which can be used between a gear box and a kneader which is easily translationally adjustable and capable of withstanding the torque applied by rotation and the pressure applied by oscillation.

SUMMARY

It is an object of the invention to provide a shaft spacing flange for a kneading machine.

A particular feature of the invention is the ability to withstand both rotation and oscillation.

These, and other advantages as will be realized, are provided in an adjustable coupler for linking an oscillating kneader to a gear box. The adjustable coupling has a slide coupler adapted to be slidably received within an output couple of a gear box. The slide coupler has external splines wherein the external splines mate with splines of the output couple thereby coupling rotation of the slide coupler with rotation of the output couple. The internal splines are capable of mating with external splines of a slidably received kneader input shaft thereby coupling rotation of the kneader input shaft with rotation of the slide coupler. A plug in the slide coupler abut the kneader input shaft in the slide coupler and a lock mechanism maintains the kneader input shaft abutted against the plug.

Yet another embodiment is provided in a kneader. The kneader has a gear box with an output couple and a screw kneader with a kneader input shaft. An adjustable coupler links the output couple to the kneader input shaft. The adjustable coupler has a slide coupler slidably received within the output couple of the gear box and the slide coupler has external splines wherein the external splines mate with splines of the output couple thereby coupling rotation of the slide coupler with rotation of the output couple. Internal splines capable of mating with external splines of a slidably received kneader input shaft couple rotation of the kneader input shaft with rotation of the slide coupler. A plug in the slide coupler abuts the kneader input shaft in the slide coupler and a lock mechanism maintains the kneader input shaft abutted against the plug.

DETAILED DESCRIPTION

The present invention is directed to a shaft spacing flange for coupling a gear box to a reciprocating kneader. More specifically, the present invention is related to a shaft spacing flange which is translationally adjusted to account for a separation between the output coupler of the gear box and the kneader input shaft.

The present invention will be described with reference to the figures which are an integral, but non-limiting, part of the instant specification. Throughout the description similar elements will be numbered accordingly.

Figure 1:
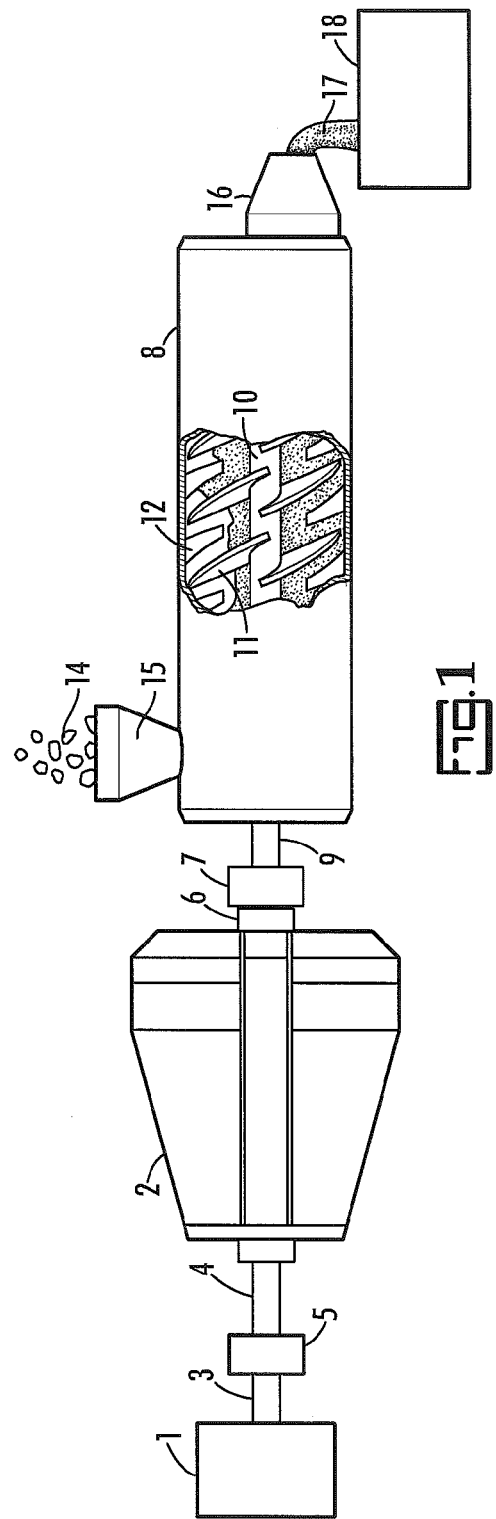
FIG. 1 is a schematic partial cross-sectional view of an embodiment of the invention.

An embodiment of the invention is illustrated in schematic partial cut-away view in FIG. 1. In FIG. 1, a drive motor, 1, having a motor drive shaft, 3, is the primary source of power for the gear box, 2. The motor drive shaft is coupled to a gear box primary shaft, 4, by a primary shaft couple, 5. The motor, which is not limited herein, may be directly coupled through a mechanism such as a transmission, gear assembly, belt assembly or the like without limit thereto. For the purposes of the present invention the drive motor is arranged to rotate the gear box primary shaft.

The gear box, 2, which is not limited herein, has an output coupler, 6, which is coupled to a kneader input shaft, 9, of a reciprocating kneader, 8, by a kneader shaft couple, 7. The kneader shaft couple insures that the rotation and oscillation of the output coupler is translated to the kneader input shaft and will be described more fully herein. The reciprocating kneader comprises a screw, 10, with a multiplicity of flights, 11, thereon. As the screw rotates and oscillates the flights pass by pins, 12, in close proximity thereby providing the kneading function. Precursor material, 14, enters a hopper, 15, wherein it passes into the kneader and exits, optionally through an extrusion die, 16, as extrudate, 17, for collection in a bin, 18.

Figure 2:
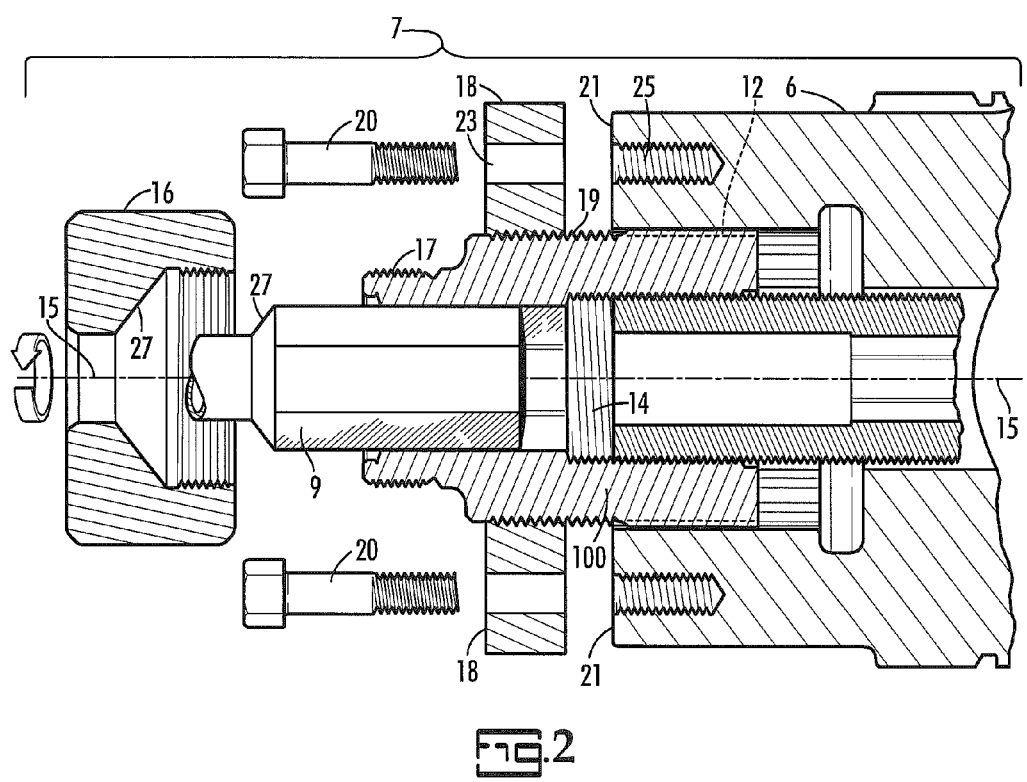
FIG. 2 is a schematic partially exploded, partial cross-sectional view of an embodiment of the invention.
Figure 3:
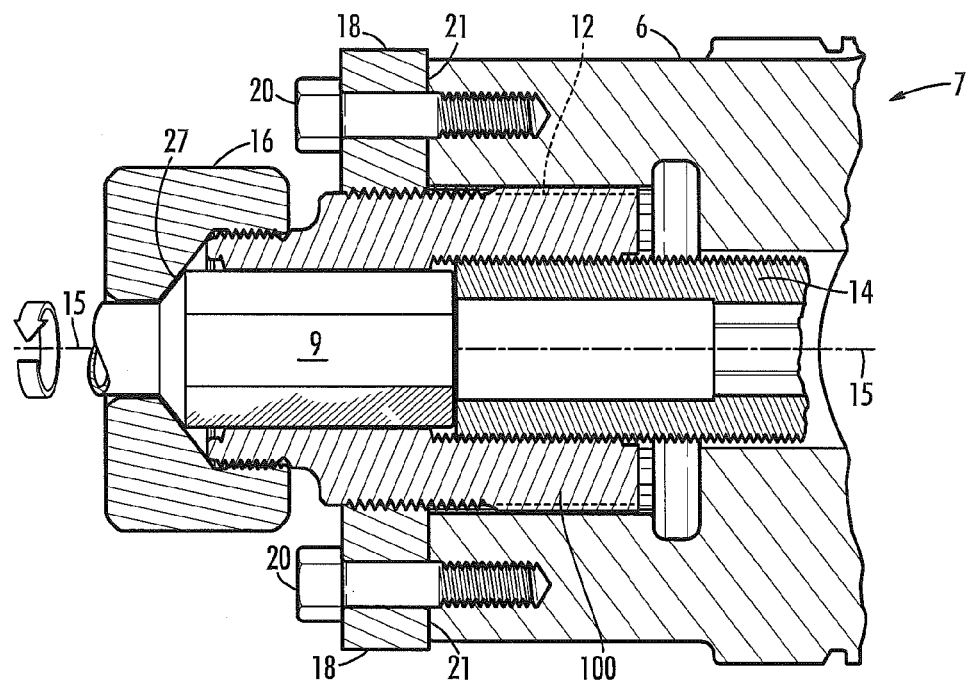
FIG. 3 is a schematic partial cross-sectional assembled view of an embodiment of the invention.

A kneader shaft couple is illustrated in exploded cross-sectional view in FIG. 2 and in assembled cross-sectional view in FIG. 3. A slide coupler, 100, is slidably received by the output coupler, 6. At least one spline, 12, prohibits rotation of the slide coupler in the output coupler thereby insuring that the slide coupler rotates in concert with the rotation of the output coupler. The spline can be a mating non-round shape or more preferably mating threads or at least one pair of mating splines or mating protrusions and slots. The kneader input shaft, 9, is slidably received in the slide coupler with splines or a mating shape, such as polygonal, to insure that the kneader input shaft rotates in concert with the slide coupler. The kneader input shaft is illustrated as being hexagonal with the understanding that the kneader input shaft and slide coupler have engaging components which are not particularly limited herein. In use, the slide coupler can slide within the output coupler parallel to the rotational axis, 15, and the kneader input shaft can slide within the slide coupler parallel to the same rotation axis. Therefore, the slide coupler has a linear range of motion parallel to the rotational axis, 15, of the output coupler. A plug, 14, having external threads is in rotation engagement with internal threads on the slide coupler. The plug can be rotated to move parallel to the rotational axis to abut against the internal end of the kneader input shaft where it is secured in abutted relationship by a lock mechanism. A lock cap, 16, with internal threads can be threaded onto external threads, 17, of the slide coupler thereby drawing the kneader input shaft into tight engagement between the plug and the lock cap due to engagement with mating shoulders, 27, thereby forming a lock mechanism. As would be realized the kneader input shaft rotates in concert with the output coupler due to the the slide coupler being rotationally fixed to both the output coupler and the input kneader shaft. A flange, 18, which may be a disk, having internal threads is rotationally engaged with external threads, 19, on the slide coupler. When the flange is rotated it translates parallel to the rotation axis until abuting with the face, 21, of the slide coupler. It is preferable that the mating threads of the flange and slide coupler have a small frequency to allow the bolt voids, 23, of the flange to align with threaded receiving voids, 25, thereby allowing bolts, 20, to be inserted through the bolt voids to draw the flange into tight abutment with the face of the slide coupler. The plug and kneader input shaft may be hollow thereby providing a channel for flow communication of fluids into the kneader screw for introduction of thermal control or measurement.

As would be realized to one of skill in the art the slide coupler couples the rotation of the output coupler of the gear box to the kneader input shaft. The slide coupler also couples the translation of the kneader input shaft to the translation of the output coupler of the gear box. Furthermore, the slide coupler can slide parallel to the rotation axis as necessary during assembly thereby eliminating the need for shims or other techniques between the output coupler of the gear box and the kneader input shaft.

Figure 4:
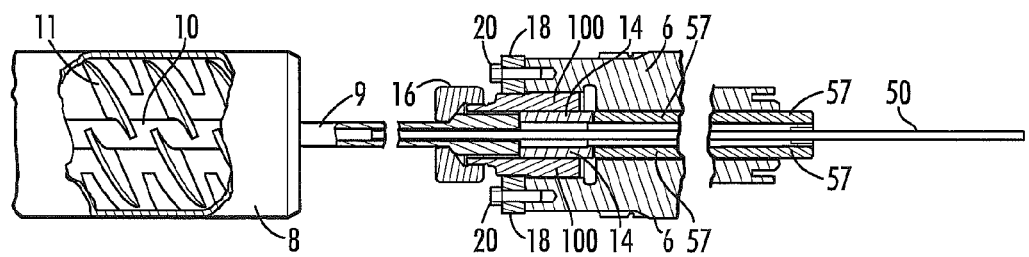
FIG. 4 is a schematic partial cross-sectional view of an embodiment of the invention.

An embodiment of the invention is illustrated in partial cross-section assembled view in FIG. 4. In FIG. 4, the slide coupler, 100, is rotationally fixed to both the output coupler, 6, and the kneader input shaft, 9, by splines or some rotational coupling element between each respective component thereby insuring that the kneader input shaft rotates in concert with the output coupler of the gearbox. The kneader input shaft is fixed between the plug, 14, and lock cap, 16, thereby insuring that the kneader input shaft translates in concert with the output coupler. The flange, 18, and associated threaded elements or bolts, 20, tightly abut the flange against the output coupler. A siphon tube, 50, allows for flow communication to the interior of the screw, 10, thereby allowing for temperature control or measurement of the screw, 10, and flights, 11, within the kneader, 8. The siphon tube may be received by a sleeve, 51.

Figure 5:
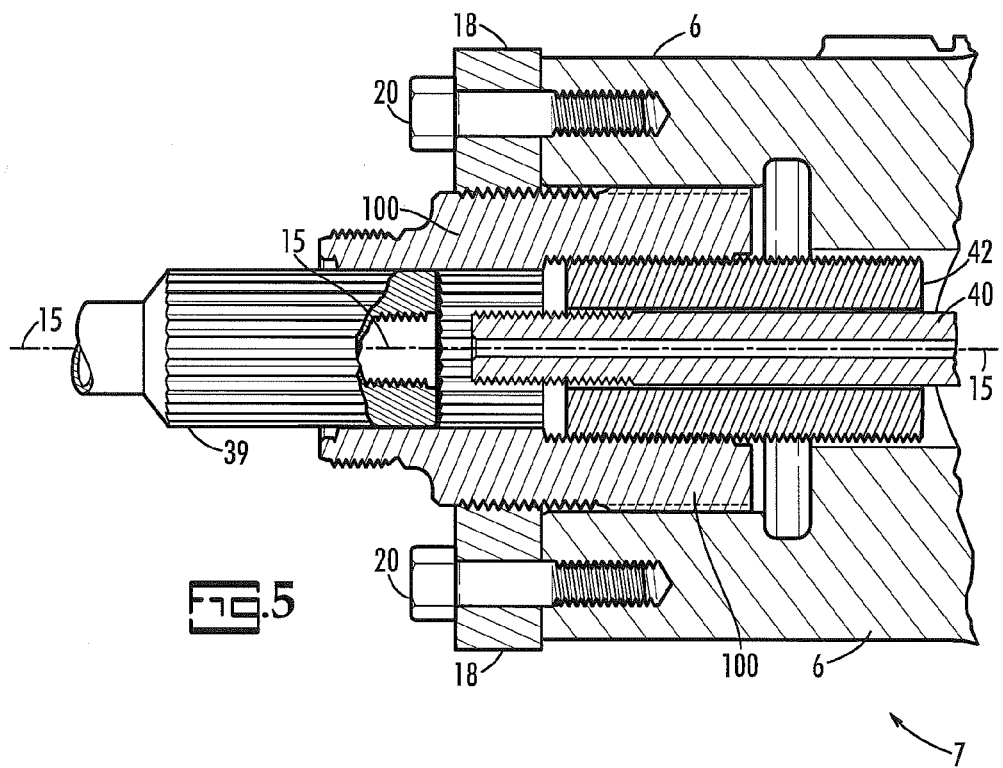
FIG. 5 is a schematic partially exploded, partial cross-sectional view of an embodiment of the invention.
Figure 6:
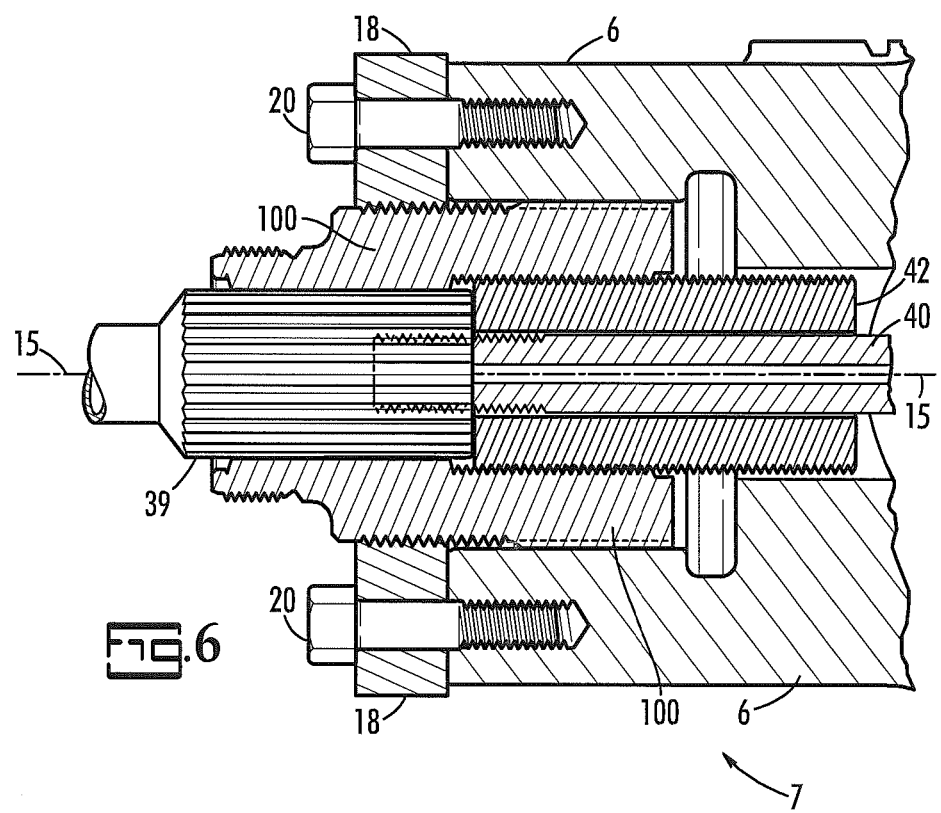
FIG. 6 is a schematic partial cross-sectional assembled view of an embodiment of the invention.

An embodiment of the invention is illustrated in partial cross-sectional and partial exploded view in FIG. 5 and in assembled partial cross-sectional view in FIG. 6. In the embodiment of FIGS. 5 and 6, the output coupler, 6, slide coupler, 100, and flange, 18, are as described relative to FIGS. 2 and 3.

An advantage of the embodiment illustrated in FIGS. 5 and 6, is the ability to utilize a process shaft, 40, to abut the kneader input shaft, 39, against the plug, 42. The kneader input shaft, 39, is slidably received by the slide coupler, 6, with splines there between to insure that both components rotate in concert. A process shaft, 40, which is preferably hollow, threads into the kneader input shaft thereby drawing the kneader input shaft into tight abutment with the plug, 42, thereby functioning as a lock mechanism. The plug is rotationally received by mating threads in the slide coupler thereby allowing the position of the slide coupler to be translationally adjusted as needed. As would be realized the kneader input shaft rotates and oscillates in concert with the output coupler, 6, of the gear box.

The invention has been described with reference to the preferred embodiments without limit thereto. One of skill in the art would realize additional embodiments, configurations and alterations which are not specifically set forth but which are within the scope of the invention as more specifically set forth in the claims appended hereto.

The invention claimed is:

1. A kneader comprising:
   a gear box comprising an output couple;
   a screw kneader comprising a kneader input shaft;
   an adjustable coupler linking said output couple to said kneader input shaft wherein said adjustable coupler comprises:
   a slide coupler adapted to be slidably received within said output couple of said gear box said slide coupler comprising:
      external splines wherein said external splines mate with splines of said output couple thereby coupling rotation of said slide coupler with rotation of said output couple; and
      internal splines capable of mating with external splines of a slidably received kneader input shaft thereby coupling rotation of said kneader input shaft with rotation of said slide coupler;
   a plug in said slide coupler adapted to abut said kneader input shaft in said slide coupler; and
   a lock mechanism capable of maintaining said kneader input shaft abutted against said plug.

2. The kneader of claim 1 wherein said lock mechanism comprises an internally threaded lock cap.

3. The kneader of claim 2 wherein said threaded lock cap is threaded onto said slide coupler.

4. The kneader of claim 2 wherein said threaded lock cap comprises a shoulder which engages with a shoulder of said kneader input shaft.

5. The kneader of claim 1 wherein said lock mechanism comprises a process shaft.

6. The kneader of claim 2 wherein said process shaft and said kneader input shaft comprise mating threads.

7. The kneader of claim 1 wherein said splines of said output couple comprises mating threads.

8. The kneader of claim 1 wherein said splines of said output couple comprises a non-round shape.

9. The kneader of claim 1 wherein said plug and said slide couple comprise mating threads.

10. The kneader of claim 1 further comprising a channel.

11. The kneader of claim 10 further comprising a siphon tube in flow communication with said channel.

* * * * *